March 21, 1961 W. C. BROSS 2,975,667
RETAINING RING FOR ROTARY STUD FASTENER
Filed July 22, 1957

INVENTOR.
WARREN C. BROSS
BY John P. Chandler
HIS ATTORNEY.

United States Patent Office

2,975,667
Patented Mar. 21, 1961

2,975,667
RETAINING RING FOR ROTARY STUD FASTENER

Warren C. Bross, Westwood, N.J., assignor to Camloc Fastener Corporation, Paramus, N.J., a corporation of New York Filed July 22, 1957, Ser. No. 673,499

1 Claim. (Cl. 85—36)

This invention relates to retaining rings for rotary stud fasteners and relates more particularly to a novel dimpled retaining washer having spring fingers extending radially inwardly from the outer peripheral section thereof which secures the male component or stud assembly of a fastener installation carried by one sheet which is to be detachably secured to a second sheet of a permanent installation.

In aircraft fasteners of this general character a sheet forming a skin is permanently secured to a section of the structure and a removable panel is carried by the fixed sheet. The stud is generally mounted in a grommet containing a spring which urges the stud outwardly when in unfastened condition. A panel of sufficient thickness is generally machine countersunk in order to accept or accommodate the flush head of the stud assembly including the grommet. The latter is held captive in the opening by a common type of generally flat washer having inwardly extending gripping fingers which are deflected outwardly as the grommet is pushed through the washer and effects a frictional grip on the side walls. Any forces tending to dislodge the ring are resisted by the fingers which bite into the side of the grommet.

This type of ring is generally satisfactory for thick outer panels but when the panel is relatively thin it must be dimpled inwardly instead of machine countersunk in order to preverse the original hole diameter which is enlarged by the machine countersinking. Due to the functional characteristics of this generally flat ring the dimpled portion immediately adjacent the hole interferes with the proper functioning of the fingers by contacting them and thereby applying a force near the inner extremity of the fingers. In other words, the dimple would conceivably act as an effective tool for releasing the fingers of the retaining ring which defeats its purpose.

An important object of the present invention is to create a retaining device which will function for its intended purpose under these circumstances and to this end the ring has a beam design of such functional characteristics that the dimple contact against the ring in the usual place is eliminated and the only contact between the dimple and the ring is in an area which will best assist it in performing its intended function.

Another object of the invention is to provide an improved ring of this character which will fit into a more compact space than the former design and will allow a still wider range of application of the original fastener.

A further object of the invention is to provide a novel retaining ring for a rotary stud fastener so designed that as the force tending to displace it increases the reaction thereto increases at a more rapid rate.

Yet another object of the invention is to provide a retaining ring suitable for mounting on a shaft for restraining axial thrust, the ring being particularly useful in cases wherein a shouldered element is carried on the shaft which prevents the ordinary retaining ring from properly functioning.

Figure 1:
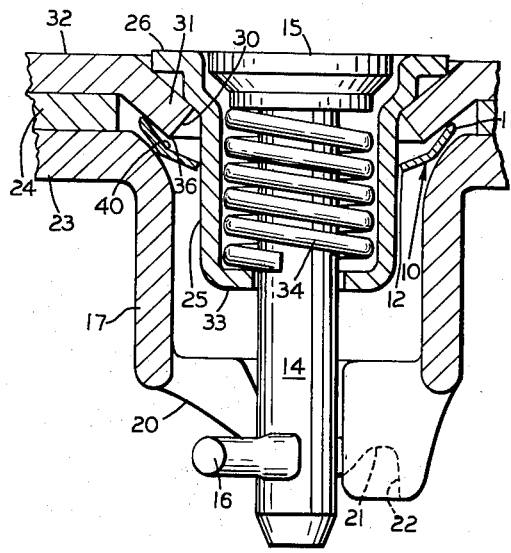
Fig. 1 is a central vertical section taken through a fastener assembly utilizing the novel retaining ring of the present invention.

The fastener retaining ring 10 of the present invention is stamped in a single piece from spring sheet metal such as high carbon steel. It consists of a frustro-conical annulus 11 forming an outer peripheral section and a plurality of substantially square spring prongs 12 extending radially inwardly from the peripheral section. The annulus in cross section is disposed at an angle of between about 25° and 35° from the plane of the face of this peripheral section or ring and the faces of the prongs lie on a plane more nearly parallel with said last mentioned plane.

The fastener assembly which forms no part of the present invention includes a stud 14 having a head 15 at its upper end and a cross-pin 16 at its lower end. It also includes a receptacle 17 having helical ramps 20 down which the cross pin travels when the stud is rotated to locked position. When the cross pin reaches the lower end of the ramps it is received in detents 21 having stops 22 limiting further rotation.

The receptacle is formed with an attaching flange 23 secured to an attaching sheet 24 carried by a structure. The stud is mounted in a grommet or cup 25 having a flange 26 at its upper end which is received within an opening 30 which is downwardly dimpled as shown at 31 in a sheet 32 to be attached to supporting sheet 24. The cup is formed with a lower annular seat 33 which limits downward travel of a spring 34 which urges head 15 of the stud upwardly.

After the stud assembly, including spring cup 25, has been passed through the opening 30 in the upper sheet the retaining ring 10 is forcibly moved over the barrel of the spring cup until it reaches the position shown in Fig. 1. When in this position it will be noted that the lower peripheral edge 36 of dimpled opening 30 in the upper sheet 32 is spaced considerably from the central section of the stud retaining ring 10 and particularly from the point 40 where the spring fingers 12 are connected with the ring 11.

Figure 2:
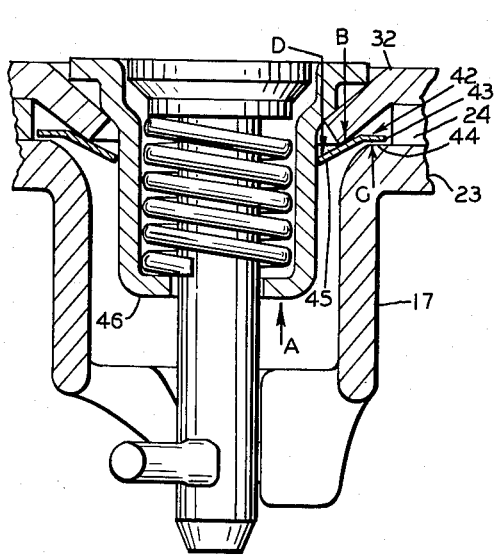
Fig. 2 shows a similar section through a fastener and illustrating the insufficiencies of the ring of the prior art in order that action of the improved ring will be better understood.
Figure 3:
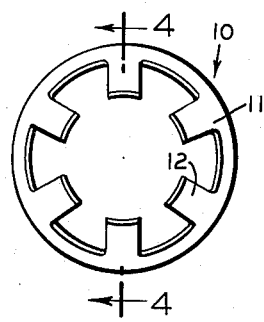
Fig. 3 is a bottom plan view of the retaining ring.
Figure 4:
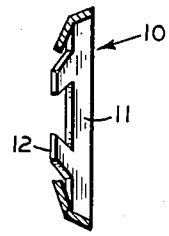
Fig. 4 is a section taken on line 4—4 of Fig. 3.

Contrasting this with the arrangement shown in Fig. 2 wherein a conventional retaining washer 42 presently used is illustrated, it will be seen that the outer or ring portion 43 thereof is located above on the upper periphery 44 of receptacle 17 where it joins flange 23. The prongs 45 which extend radially inwardly from the ring are inclined downwardly at an angle of about 30° from the general plane of the ring section. In order to prevent interference of ring element 42 at point C a relatively heavy gauge material must be used for sheet 24. With the ring shown in Fig. 1 the fastener is more widely applicable since this ring will tolerate a substantially thinner gauge material for element 24 before any interference occurs.

The ring of Fig. 2 comprises a substantially flat annulus with slightly downwardly formed prongs. When the cup is forced through the prongs the outer annulus portion of the ring becomes slightly conical with its outer periphery deflected slightly upwardly from its initial plane and when applied to an installation not incorporating a dimple this outer upper peripheral edge becomes the point of reaction load application when a force is exerted tending to move the cup back out of the ring. Accordingly this reaction force tends to restore the entire ring to its original shape, causing the prongs to grip more tightly. However in the case of a dimpled application where this reaction force is applied considerably inwardly on the prongs, rather than on the periphery of the ring, this mechanical advantage which causes the prongs to grip more tightly is not created and therefore it is virtually as easy to remove the ring as it is to install it. In other words, the force required to push the retaining ring off is substantially equal to the force required to push it on whereas this first mentioned required force should be equal roughly to ten times the second required force.

In dimpled installations where the sheet 24 is thin enough so that the lower face of the outer periphery or body section 11 of ring 10 will come to bear at point C while there still exists space between sheet 24 and sheet 32, there is set up a force diagram or system of forces relative to points B and C. As sheets 24 and 32 are finally brought together, this force system will deform the ring in the same pattern and to a larger extent than that which takes place when the cup is initially forced into the ring and thereby causes a complete loss of gripping function of the ring. In either Case 1 or 2 the unique curved beam design of the improved ring of the present invention results in the functional reaction contact at the upper outer peripheral edge to be maintained, thereby always setting up the correct force diagram or system of forces which retains the gripping function of the ring.

While there have been described herein what are at present considered preferred embodiments of the invention it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

The combination of a cup-shaped member and a retaining washer securing said cup-shaped member within an inwardly dimpled opening in a sheet to resist outward thrust of the member, said washer comprising a circumferentially continuous ring of generally frustro-conical contour formed of spring metal and provided with a plurality of spaced, generally rectangular gripping spring fingers extending radially inwardly from the small diameter end of the frustro-conical ring along a bend line, the metal in the areas between the fingers being removed to provide the spaces between the fingers, the frustro-conical walls of the ring lying at an acute angle relative to a plane that is normal to the axis of the ring and the fingers lying at a lesser acute angle to said plane, and extending in the same general direction as said ring, the inner diameter of the ring as defined by the inner edges of the fingers being originally less than that of the outer diameter of the cup-shaped member, the washer being forced onto said member with its concave side outermost whereby the fingers are deflected inwardly under a bending stress and grip the member and resist outward thrust while the washer sections adjacent the bend line are spaced from the lower annular periphery of the dimpled opening.

References Cited in the file of this patent

UNITED STATES PATENTS

| | | |
|---|---|---|
| 1,675,277 | Roe | June 26, 1928 |
| 1,849,604 | Weatherhead | Mar. 15, 1932 |
| 2,577,319 | Feitl | Dec. 4, 1951 |
| 2,676,049 | Wurzel | Apr. 20, 1954 |
| 2,846,744 | Becker | Aug. 12, 1958 |

FOREIGN PATENTS

| | | |
|---|---|---|
| 627,059 | Great Britain | July 27, 1949 |
| 702,932 | Great Britain | Jan. 27, 1954 |